United States Patent
Obrecht

(10) Patent No.: US 8,571,310 B2
(45) Date of Patent: Oct. 29, 2013

(54) CREATING A LUMINANCE EFFECT USING AN ICC PROFILE

(75) Inventor: Douglas Walter Obrecht, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 100 days.

(21) Appl. No.: 13/308,397

(22) Filed: Nov. 30, 2011

(65) Prior Publication Data

US 2013/0136345 A1    May 30, 2013

(51) Int. Cl.
*G06K 9/00* (2006.01)
(52) U.S. Cl.
USPC ............................ 382/162; 382/165; 382/167

(58) Field of Classification Search
USPC ................. 382/100, 162, 165, 167, 168, 181; 358/1.9, 3.28, 504; 345/102, 207, 208, 345/589, 590, 604; 348/609, 663; 713/176
See application file for complete search history.

(56) References Cited

U.S. PATENT DOCUMENTS 6,559,826 B1 * 5/2003 Mendelson et al. .......... 345/102
7,289,339 B2 * 10/2007 Chou et al. ................. 363/21.07

* cited by examiner

*Primary Examiner* — Anh Do
(74) *Attorney, Agent, or Firm* — Osha Liang LLP

(57) ABSTRACT

A method for creating a luminance effect, including: obtaining a source image in a red-green-blue (RGB) color space; obtaining a luminance effect parameter; generating an international color consortium (ICC) device link profile based on the luminance effect parameter; and converting the source image in RGB color space to a final image in RGB color space using a color conversion function with the ICC device link profile.

20 Claims, 4 Drawing Sheets

CREATING A LUMINANCE EFFECT USING AN ICC PROFILE

CROSS-REFERENCE TO RELATED APPLICATIONS

The present application contains subject matter that may be related to the subject matter in U.S. patent application Ser. No. 13/308,393; filed on Nov. 30, 2011; and entitled: "CREATING A DUOTONE COLOR EFFECT USING AN ICC PROFILE".

BACKGROUND

Color conversion algorithms are used to convert images in one color space to another color space. These algorithms are extensively used across the graphics and image processing industries and are typically very fast to execute. Color effects algorithms, such as luminance control (e.g., brightness, contrast), duotones, and HSL adjustments, are normally more complex than color conversion algorithms, and typically require more computational power to execute than color conversion algorithms. In other words, when color effects algorithms are performed on large images, performance of a system may be negatively affected. Despite the reduction in performance, users still want to apply color effects to images.

SUMMARY

In general, in one aspect, the invention relates to a method for creating a luminance effect. The method comprises: obtaining a source image in a red-green-blue (RGB) color space; obtaining a luminance effect parameter; generating an international color consortium (ICC) device link profile based on the luminance effect parameter; and converting the source image in RGB color space to a final image in RGB color space using a color conversion function with the ICC device link profile.

In general, in one aspect, the invention relates to a non-transitory computer readable medium (CRM) storing instructions for creating a luminance effect. The instructions comprise functionality for: obtaining a source image in a red-green-blue (RGB) color space; obtaining a luminance effect parameter; generating an international color consortium (ICC) device link profile based on the luminance effect parameter; and converting the source image in RGB color space to a final image in RGB color space using a color conversion function with the ICC device link profile.

In general, in one aspect, the invention relates to a system for creating a luminance effect from a luminance effect parameter. The system comprises: a processor; a buffer for storing a portion of a source image in a RGB color space; a color profile module executing on the processor and configured to generate an international color consortium (ICC) device link profile based on the luminance effect parameter; and a conversion engine executing on the processor and comprising a color converter configured to convert the portion in the buffer to a final image in RGB color space using a color effects transform generated from the ICC device link profile.

Other aspects of the invention will be apparent from the following description and the appended claims.

DETAILED DESCRIPTION

Figure 1:
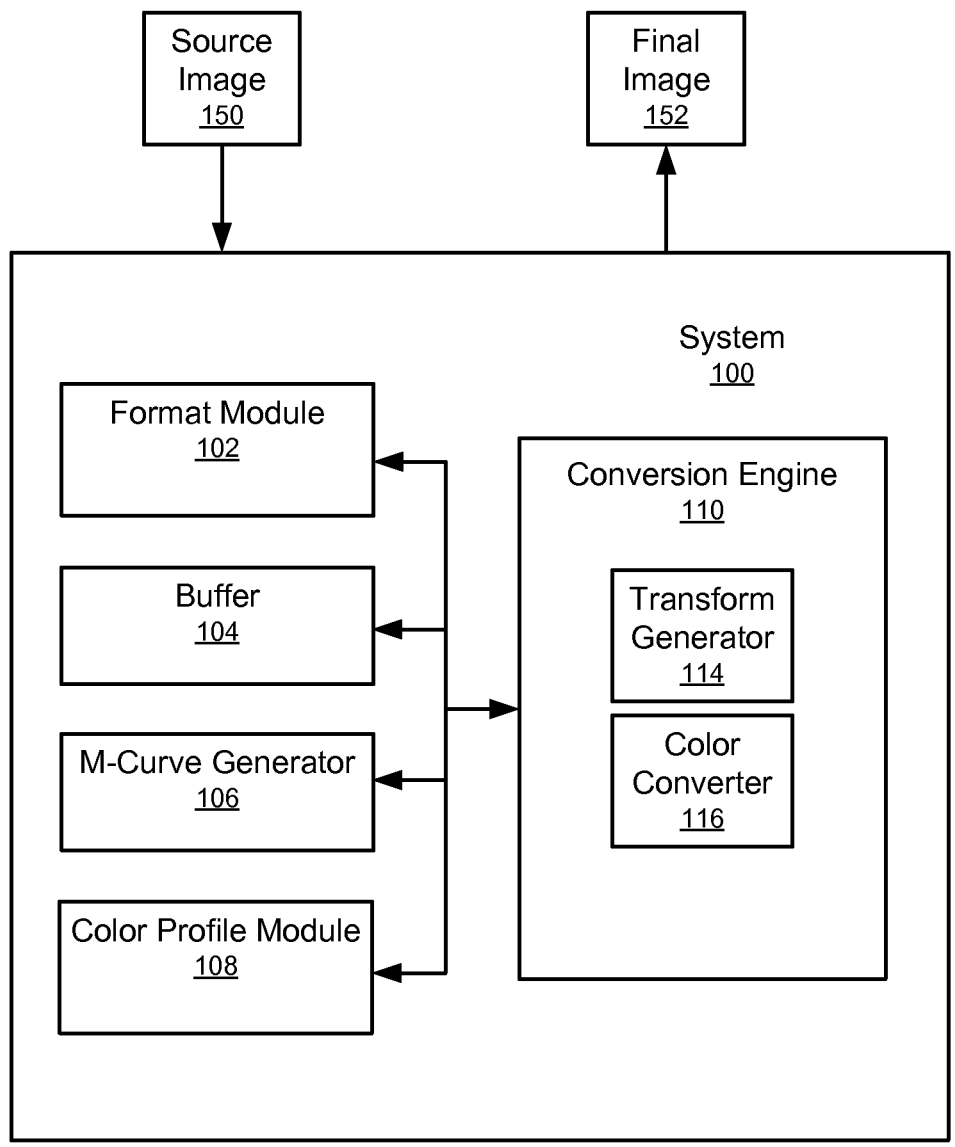
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for creating a luminance effect (i.e., adjustments to brightness and/or contrast). Specifically, an International Color Consortium (ICC) device link profile is created from one or more luminance parameters provided by a user. A source image is converted to a final image having the adjusted brightness/contrast by invoking a color conversion algorithm that inputs the ICC device link profile and the RGB source image.

FIG. 1 shows a system (100) in accordance with one or more embodiments of the invention. As shown in FIG. 1, the system (100) has multiple components including a conversion engine (110), a format module (102), a buffer (104), an M-curve generator (106), and a color profile module (108). These components may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. As shown in FIG. 1, the system (100) inputs a source image (150) and outputs a final image (152).

The RGB color space adds together red, green, and blue light in various ways to reproduce a broad array of colors. A color in the RGB color space is described by indicating how much of each of red, green, and blue is included. The color is expressed as an RGB tuple (R, G, B), each component of which can vary from zero to a defined maximum value. If all the components are at zero the result is black. If all are at maximum, the result is the brightest representable white.

RGB tuple ranges may be quantified in various ways. Each component can be represented by values from 0 to 1, with any fractional value in between. This representation is used in theoretical analyses, and in systems that use floating-point representations. Each color component value can also be written as a percentage, from 0% to 100%. In computing, the component values are often stored as integer numbers in the range 0 to 255, the range that a single 8-bit byte can offer (i.e. by encoding 256 distinct values). These may be represented as either decimal or hexadecimal numbers. High-end digital image equipment can deal with the integer range 0 to 65,535 for each primary color, by employing 16-bit words instead of 8-bit bytes.

In one or more embodiments of the invention, a format module (102) is configured to convert a source image (150) from an arbitrary color space to the RGB color space. The arbitrary color space refers to any other color space beyond the RGB color space. Examples of other color spaces include Tristimulus, CIE XYZ, CMYK, and CIELab. The format module (102) is also configured to convert a final image (152) from RGB color space to the arbitrary color space (e.g., CMYK, etc.).

In one or more embodiments of the invention, the buffer (104) is configured to store a portion of a source image in an RGB color space. The portion of the source image may be, for instance, a line of the image (i.e. a set of contiguous pixels). The portion may be used to generate the final image (152). In other words, the source image (150) may be converted to the final image (152) on a line-by-line basis. Those skilled in the art will appreciate that the buffer (104) may obtain the portion from other entities beyond the source image (150), and may perform other functions beyond those disclosed.

In one or more embodiments of the invention, the M-curve generator (106) is configured to calculate start positions and end positions for one or more M-curve from the luminance effect parameter(s), and generate a lookup table implementing each M-curve. An M-curve may be created for each of the RGB components and represent a mathematical transformation that implements the luminance effect. The start point, end point, slope, and/or curvature of an M-curve may be altered according to the luminance parameter(s) to implement the luminance effect desired by the user.

In the RGB color space, brightness may be considered the arithmetic mean $\mu$ of the red, green, and blue color coordinates. Specifically, $\mu=(R+G+B)/3$. Contrast is the difference in visual properties that makes an object or image distinguishable from other objects and the background. Contrast is determined by the difference in the color and brightness of an object and other objects within the same field of view.

In one or more embodiments of the invention, a color profile module (108) is configured to generate an International Color Consortium (ICC) device link profile based on the luminance effect parameter. Specifically, the color profile module (108) generates an ICC device link profile including the M-curves. A device link profile is a special kind of ICC profile that converts the color space of the input device directly into the color space of the output device, whereby the output device can be either a physical printer or a file format. Unlike ordinary source or destination profiles, ICC device link profiles do not describe a specific color space, but define the conversion from a source color space to a destination color space. In one or more embodiments of the invention, the source color space and the destination color space are both the RGB color space.

In one or more embodiments of the invention, the transform generator (114) is configured to generate a color effects transform from the ICC device link profile. The ICC device link profile is a file format, whereas the color effects transform is the internal representation of the ICC device link profile, which contains most of the data within the ICC device link profile as well as other information that is required by the color conversion function/algorithm. In one or more embodiments of the invention, the color effects transform maps RGB tuples of the source image (150) to the final RGB tuples of the final image (152). In other words, the color effects transform maps a pixel's RGB tuple (R, G, B) to a final RGB tuple (R$'$, G$'$, B$'$), implementing the luminance effect desired by the user.

In one or more embodiments of the invention, a color converter (116) is configured to convert the portion of the source image (150) in the buffer (104) to the final image (152) in RGB color space using a color effects transform generated from the ICC device link profile. The color converter (116) may obtain the color effects transform from the transform generator (114). Moreover, the color converter (116) may invoke a color conversion algorithm to create the final image (152). Those skilled in the art will appreciate that the color converter (116) may perform other functions beyond those disclosed.

Figure 2:
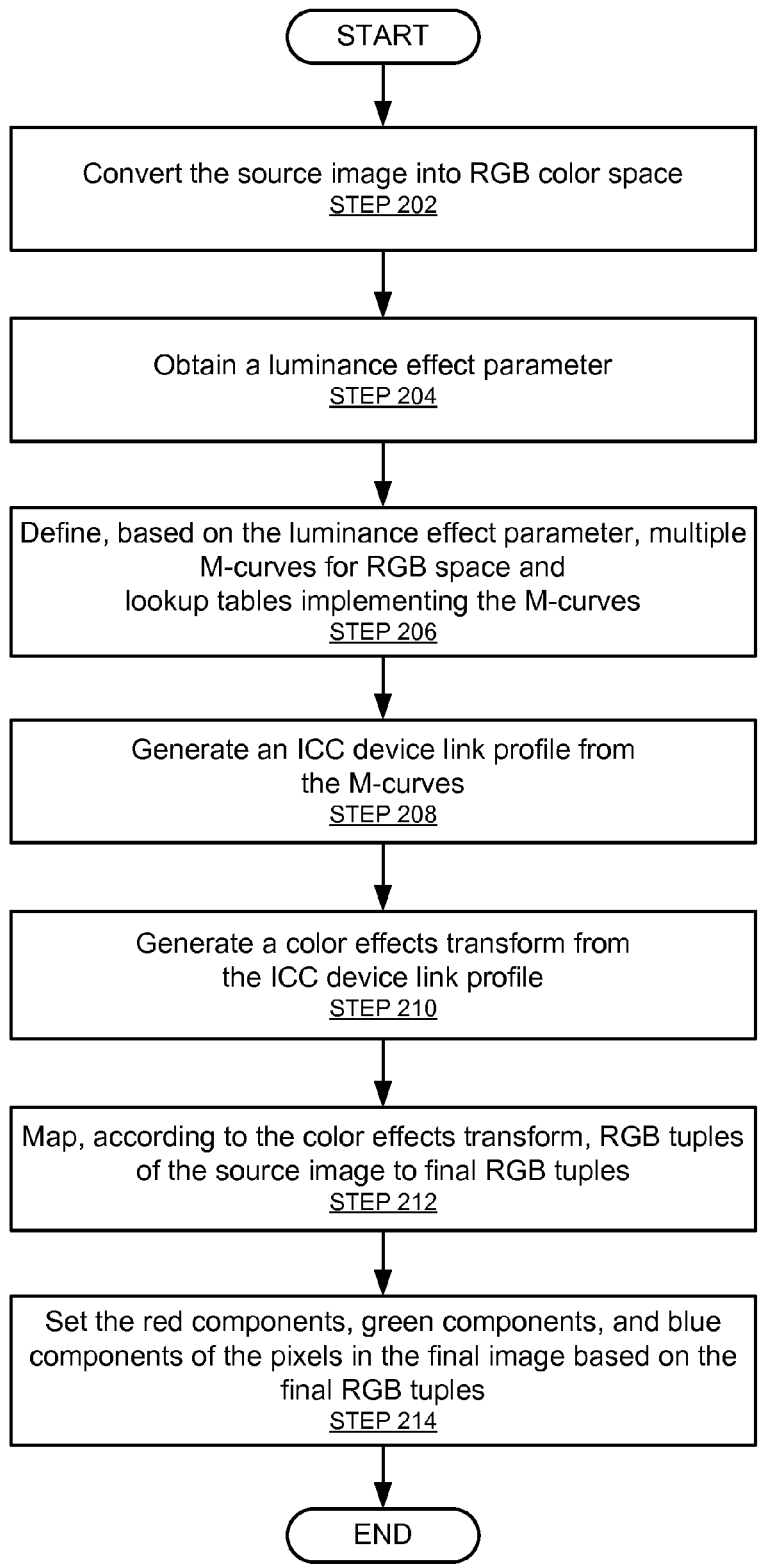
FIG. 2 shows a flowchart in accordance with one or more embodiments of the invention.

FIG. 2 shows a flowchart in accordance with one or more embodiments of the invention. The process shown in FIG. 2 may be used, for example, with the system (100), to create a luminance effect. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 202, a source image is converted into the RGB color space. The source image may be in an arbitrary color space, and is converted into the RGB color space using a color transformation. For example, the source image may be converted from the CMYK color space into the RGB color space. Those skilled in the art, having the benefit of this detailed description will appreciate that STEP 202 may be omitted if the source image is already in the RGB color space.

In STEP 204, a luminance effect parameter is obtained. The luminance effect parameter may be associated with a color effect such as brightness and/or contrast. The luminance effect parameter may be obtained from a user of the system. In other words, the luminance effect parameter(s) are specified by the user.

In STEP 206, multiple M-curves are defined based on the luminance effect parameter(s). An M-curve may be created for each of the RGB components and represent a mathematical transformation that implements the luminance effect. The start point, end point, slope, and/or curvature of an M-curve may be altered according to the luminance parameter to implement the luminance effect desired by the user. The M-curve may be implemented as a lookup table with 255 entries.

In STEP 208, an ICC device link profile is generated from the M-curves. The ICC device link profile may, for instance, include a 3×3 matrix, N-curves, an N×M lookup table, and the M-curves. However, the 3×3 matrix, the N curves, and the N×M lookup table will be unity.

In STEP 210, a color effects transform is generated from the ICC device link profile. In STEP 212, RGB tuples of the source image are mapped, according to the color effects transform, to final RGB tuples. Specifically, the color effects transform maps a pixel's RGB tuple (R, G, B) to a final RGB tuple (R$'$, G$'$, B$'$). This mapping represents the implementation of the color effects transform to add luminance effects to the source image. In STEP 214, the red, green, and blue components of the pixel are set to R$'$, G$'$, and B$'$ respectively. The mapping is executed for every pixel in the source image. In one or more embodiments of the invention, STEPS 210, 212, and 214 are performed by a color conversion algorithm. In such embodiments, the color conversion algorithm inputs the ICC device link profile and the source image with RGB tuples, and outputs the final image with the final RGB tuples having the desired luminance effect.

Figure 3:
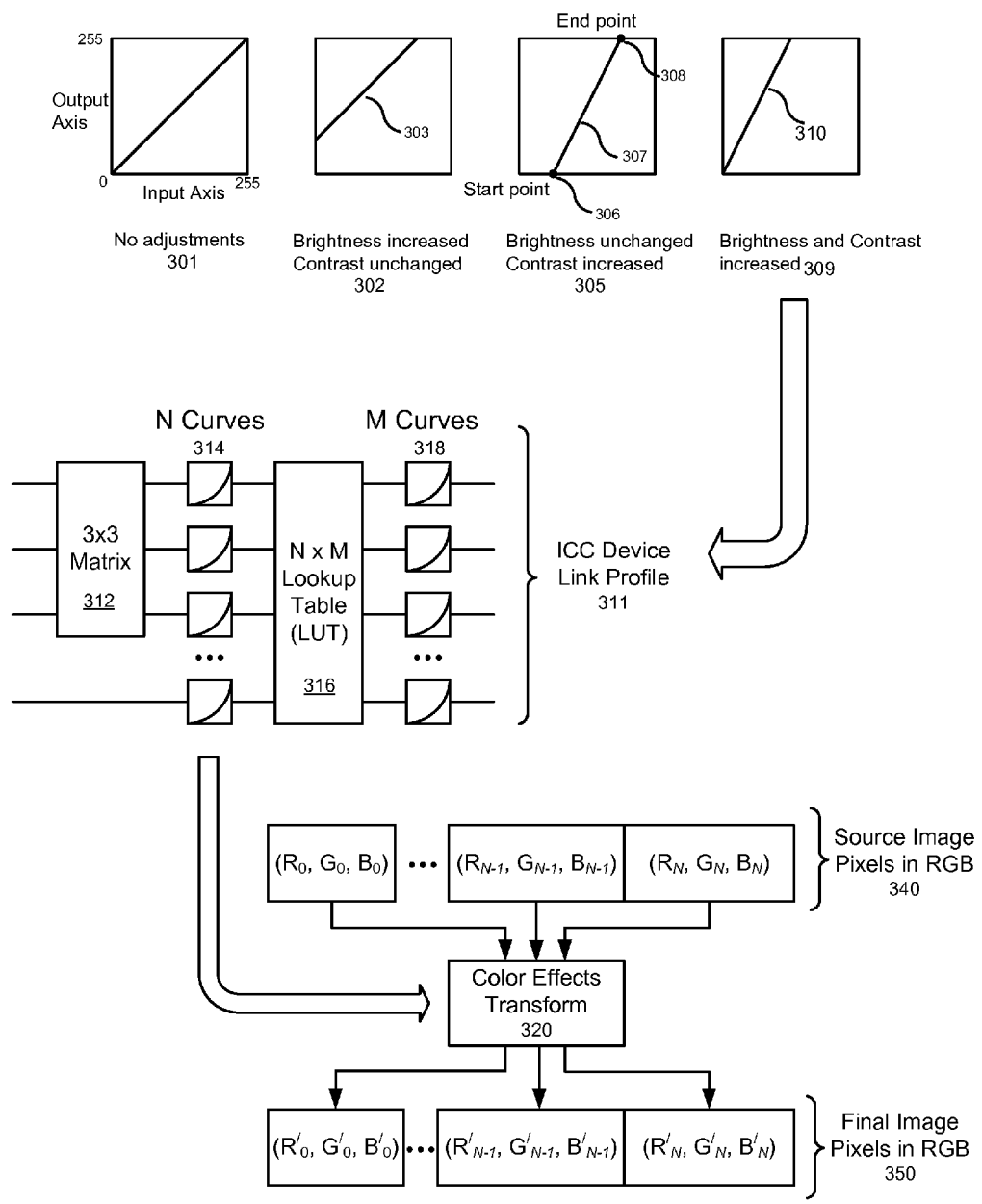
FIG. 3 shows an example in accordance with one or more embodiments of the invention.

FIG. 3 shows an example in accordance with one or more embodiments of the invention. The example shown in FIG. 3 may be used, for example, with the system (100), to create a luminance effect. The sequence of steps and/or elements shown in FIG. 3 may differ among embodiments of the invention, and one or more of the steps may be performed in parallel and/or may be optional.

FIG. 3 shows various M-curves (301, 302, 305, 309) for different luminance effect parameters (e.g., adjustments in brightness and/or contrast). Each M-curve is displayed in a graph of two axes—an input axis and an output axis, along a range from 0-255. The input and output axes represent individual components of the source image color space (e.g. RGB).

M-curve (301) represents the identity transformation (i.e., no adjustments). Accordingly, M-curve (301) is a line governed by the equation $y=x$. M-curve (302) represents an increase in brightness, with an unchanged contrast. Specifically, the line (303) is shifted vertically, with respect to the identity transformation, based on the luminance effect parameter. However, there is no change in slope. This upwards shift corresponds to an increase in brightness, while the unchanged slope corresponds to no-change in contrast. M-curve (305) represents an increase in contrast, but no change in brightness. Specifically, the change in the slope of the line (307) is the result of new start point (306) and/or new end point (308) calculated from the luminance effect parameter(s). M-curve (309) represents an increase in both the brightness and the contrast of an image. Specifically, the change in the end point of line (310) and the change in the slope of the line (310), as calculated from the luminance effect parameter(s), changes both the brightness and the contrast. Each of these M-curves may be implemented as a lookup table having 255 entries, or other suitable data structure.

The ICC device link profile (311) is generated using the M-curves. The ICC device link profile (311) represents a color transformation. The ICC device link profile (311) may contain various elements, including a 3×3 matrix (312), a set of one-dimensional N-curves (314), a multi-dimensional N×M lookup table (LUT) (316), and a set of one-dimensional M-curves (318). Image data may be processed using these elements in the following sequence: image input→3×3 matrix (312)→N-curves (314)→N×M LUT (316)→M-curves (318) (i.e., output). The 3×3 matrix (312), the N curves (314), and the N×M LUT (316) may be set to identity transforms. In this scenario, the M-curves (318) are effectively used to perform the color effect transformation, accepting RGB tuples as input, and producing final RGB tuples. As this implementation may deal with RGB to RGB conversions, both N and M may be equal to 3.

The color effects transform (320) is created from the ICC device link profile (311). It is the color effects transform (320) that is actually used for the ICC color conversion. In other words, the RGB tuples of the source image (340) are converted/mapped to final RGB tuples (350) using the color effects transform (320). This process may be executed by an ICC color conversion algorithm. For example, RGB tuple $(R_0, G_0, B_0)$ is mapped to final tuple $(R_0', G_0', B_0')$. Similarly, RGB tuple $(R_N, G_N, B_N)$ is mapped to final tuple $(R_N', G_N', B_N')$. Once all the RGB tuples (340) have been mapped, the resulting final RGB image may be optionally be converted to the final destination color space (e.g., CMYK).

Embodiments of the invention have one or more of the following advantages: the ability to implement a luminance effect; the ability to implement a luminance effect using an ICC color conversion algorithm; the ability to generate an ICC device link profile based on luminance effect parameter(s); the ability to repeatedly use an ICC device link profile to convert a source image (or a line of a source image) to a final image with the desired luminance effect, etc.

Figure 4:
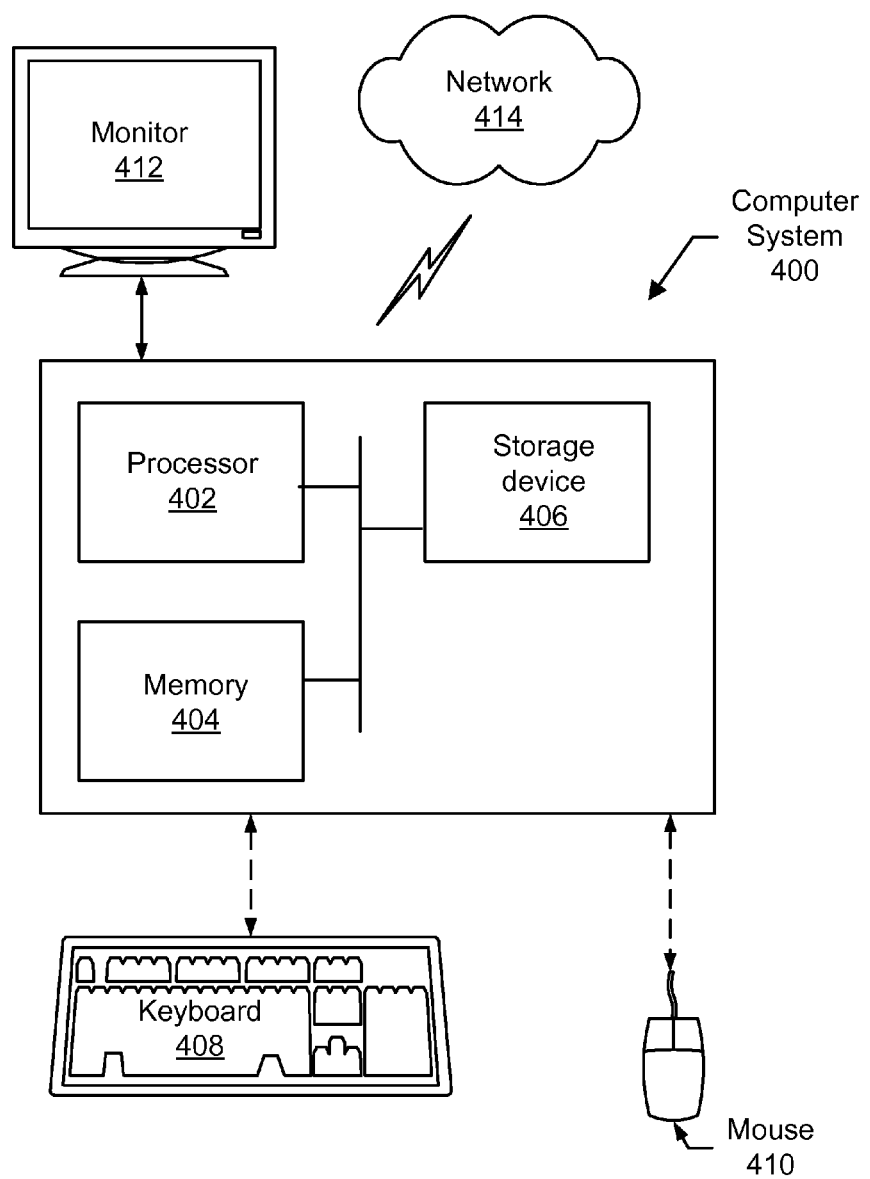
FIG. 4 shows a computer system in accordance with one or more embodiments of the invention.

Embodiments of the invention may be implemented on virtually any type of computer regardless of the platform being used. For example, as shown in FIG. 4, the computer system (400) includes one or more processor(s) (402), associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. conversion engine, format module, buffer, M-curve generator, color profile module) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a luminance effect, comprising:
   obtaining, by a processor, a source image in a red-green-blue (RGB) color space;
   obtaining, by the processor, a luminance effect parameter;
   generating, by the processor, an international color consortium (ICC) device link profile based on the luminance effect parameter; and converting, by the processor, the source image in RGB color space to a final image in RGB color space using a color conversion function with the ICC device link profile.

2. The method of claim 1, wherein the luminance parameter comprises a brightness parameter.

3. The method of claim 1, wherein the luminance parameter comprises a contrast parameter.

4. The method of claim 1, wherein generating the ICC device link profile comprises:
calculating a start position and an end position for an M-curve from the luminance effect parameter; and
generating a lookup table implementing the M-curve,
wherein the ICC device link profile includes the lookup table implementing the M-curve.

5. The method of claim 4, wherein the M-curve corresponds to one selected from a group consisting of a red component, a green component, and a blue component of the RGB color space.

6. The method of claim 1, wherein the ICC comprises a plurality of unity N-curves corresponding to a red component, a green component, and a blue component of the RGB color space.

7. The method of claim 1, wherein converting the source image comprises:
generating a color effects transform from the ICC device link profile;
mapping, using the color effects transform, a RGB tuple of a pixel of the source image to a final RGB tuple; and
setting a red component, a green component, and a blue component of a pixel in the final image based on the final RGB tuple.

8. The method of claim 1, further comprising:
converting the source image from an arbitrary color space to the RGB color space; and
converting the final image from the RGB color space to the arbitrary color space.

9. A non-transitory computer readable medium (CRM) storing instructions for creating a luminance effect, the instructions comprising functionality for:
obtaining a source image in a red-green-blue (RGB) color space;
obtaining a luminance effect parameter;
generating an international color consortium (ICC) device link profile based on the luminance effect parameter; and
converting the source image in RGB color space to a final image in RGB color space using a color conversion function with the ICC device link profile.

10. The non-transitory CRM of claim 9, wherein the luminance parameter comprises a brightness parameter.

11. The non-transitory CRM of claim 9, wherein the luminance parameter comprises a contrast parameter.

12. The non-transitory CRM of claim 9, wherein the instructions for generating the ICC device link profile comprise functionality for:
calculating a start position and an end position for an M-curve from the luminance effect parameter; and
generating a lookup table implementing the M-curve,
wherein the ICC device link profile includes the lookup table implementing the M-curve.

13. The non-transitory CRM of claim 12, wherein the M-curve corresponds to one selected from a group consisting of a red component, a green component, and a blue component of the RGB color space.

14. The non-transitory CRM of claim 9, wherein the ICC device link profile comprises a plurality of unity N-curves corresponding to a red component, a green component, and a blue component of the RGB color space.

15. The non-transitory CRM of claim 9, wherein the instructions for converting the source image comprise functionality for:
generating a color effects transform from the ICC device link profile;
mapping, using the color effects transform, a RGB tuple of a pixel of the source image to a final RGB tuple; and
setting a red component, a green component, and a blue component of a pixel in the final image based on the final RGB tuple.

16. The non-transitory CRM of claim 9, the instructions further comprising functionality for:
converting the source image from an arbitrary color space to the RGB color space; and
converting the final image from the RGB color space to the arbitrary color space.

17. A system for creating a luminance effect from a luminance effect parameter, comprising:
a processor;
a buffer for storing a portion of a source image in a RGB color space;
a color profile module executing on the processor and configured to generate an international color consortium (ICC) device link profile based on the luminance effect parameter; and
a conversion engine executing on the processor and comprising a color converter configured to convert the portion in the buffer to a final image in RGB color space using a color effects transform generated from the ICC device link profile.

18. The system of claim 17, further comprising:
an M-curve generator configured to:
calculate a start position and an end position for an M-curve from the luminance effect parameter; and
generate a lookup table implementing the M-curve,
wherein the ICC device link profile includes the lookup table implementing the M-curve.

19. The system of claim 17, wherein the conversion engine further comprises:
a transform generator configured to generate the color effects transform from the ICC device link profile,
wherein the color effects transform maps a RGB tuple of a pixel of the source image to a final RGB tuple.

20. The system of claim 19, wherein the conversion engine is configured to:
set a red component, a green component, and a blue component of a pixel in the final image based on the final RGB tuple.

* * * * *